Patented Oct. 10, 1933

1,930,205

UNITED STATES PATENT OFFICE 1,930,205

PRODUCTION OF TRI-SODIUM PHOSPHATE

Nils Carlson Lindberg, Crete, Ill., assignor to Victor Chemical Works, a corporation of Illinois No Drawing. Application January 11, 1932
Serial No. 586,071

5 Claims. (Cl. 23—106)

This invention relates to an improvement in the production of tri-sodium phosphate from ferrophosphorus, and more particularly to the separation of undesirable constituents of the reaction mixture.

In carrying out the production of tri-sodium phosphate from ferrophosphorus and caustic soda or sodium carbonate, as for example, in the co-pending application of Lindberg & Toubes, Ser. No. 506,303, filed January 2, 1931, it is highly desirable to secure a continuous process, running the material steadily through the plant into the crystallizers. One of the difficulties present in carrying out such a process is that there is present in the original ingredients a small percentage of chlorides and sulphates, principally sodium chloride and sodium sulphate, which unless eliminated, tend to collect in the mother liquor from which the tri-sodium phosphate is crystallized and there interfere with the crystallization and contaminate the product. Once these impurities have progressed into the mother liquor, it is commercially impracticable to remove them.

By means of this invention, however, practically all of the chlorides and sulphates may be eliminated, and the removal may readily be carried to such an extent that the amount of these substances remaining is entirely inconsequential. In order to effect such separation, the ferrophosphorus is preferably comminuted, say, to 200 mesh, mixed with soda ash and charged into a kiln after such preliminary treatment as is desired for example, moistening and preheating. A strong blast of gases is then sent through the kiln, as, for example, in a kiln of 5 ft. diameter at a lineal velocity of, say, more than 3 ft. per second, and preferably around 5-8 ft. per second. Preferably, these gases may also comprise the means of heating the reaction mixture. Preferably, the gases of combustion of petroleum hydrocarbons at a temperature of, say 600–1,300° C. are employed. During their progress through the kiln, I have found that the chlorides and sulphates are practically completely carried from the reaction mixture by the hot gases. The amount remaining is too small to be of consequence. At the same time only a relatively very small proportion of the other ingredients is removed.

I have made the further discovery, however, that even these other ingredients may be separated and returned to the reaction mixture. This is preferably accomplished by removing the gases while still hot and while moving at a considerable velocity, as, for example, in a stack of 2 to 3 ft. diameter at an average lineal velocity of say, 10 ft. to 40 ft. per second. The gases may then be centrifugalized to remove up to about 95% of the solids therein, preferably while still maintaining a high velocity. For example, in a nine inch centrifugalizer an entrance velocity of, say, 50 to 75, and preferably 55 to 65 lineal ft. per second is in general satisfactory. The number of centrifugalizers and the speed at which the gases are passed through them will, of course, depend upon the amount of impurities in the ingredients, the extent of desirable constituents it is desired to retain, and upon other obvious factors such as the fineness to which the original ingredients have been ground. The temperature of the gases and the amount of moisture, if any, present, likewise may have an effect upon the separation, but a velocity in general within the range stated will be found most satisfactory.

The extent of the centrifulgalizing may be controlled within wide ranges, depending upon the amount of ferrophosphorus and tri-sodium phosphate it is desired to recover from the gases, so long as recovery is not carried beyond about 95% of the solids contained by said gases. If the centrifugalizing is carried to a point where a greater proportion of the solids is precipitated, more and more of the chlorides and sulphates may likewise be deposited.

As a result of this centrifugalizing, the major portion of the sodium chloride and practically all of the sodium sulphate are separated from the other solids and permitted to escape, while in general approximately 90% of the remaining ingredients are recovered. For example, in a large number of runs the recovered material contained on an average, approximately 34.0% ferrophosphorus, 35.0% sodium carbonate, 18.8% tri-sodium phosphate, 9.8% iron oxide, 0.73% sodium chloride and no appreciable sodium sulphate, whereas an analysis of the solids passing through the centrifugalizers and removed from the system constituted about 10% of those recovered and showed only 1% ferrophosphorus, .9% iron oxide, 7.9% tri-sodium phosphate, 70.00% sodium carbonate, 10.1% sodium chloride, 10.9% sodium sulphate.

On a comparative basis, approximately two-thirds of the sodium chloride was separated and removed and all of the sodium sulphate, whereas 96% of the tri-sodium phosphate, 99.6% of the ferrophosphorus, 99.1% of the iron oxide and 80% of the sodium carbonate in the gases were recovered.

The foregoing detailed description has been given for clearness of understanding only, and no unnecessary limitations should be understood therefrom, but the appended claims should be construed as broadly as permissible, in view of the prior art.

I claim:

1. The method of eliminating chlorides and sulphates from the continuous production of tri-sodium phosphate from comminuted ferrophosphorus and sodium carbonate containing chlorides and sulphates which comprises: admixing comminuted ferrophosphorus with sodium carbonate, heating said mixture in a heating zone to a reaction temperature below fusion, whereby said ferrophosphorus is converted to tri-sodium phosphate, removing sulphates and chlorides by means of a blast of heated gases passed over said reaction mixture, removing said gases from said reaction mixture, separating the sulphates and chlorides from the remaining constituents of said gases by centrifugalizing said gases to recover not more than 95% of the solids therefrom, returning the centrifugalized solids to the reaction mixture while removing the sulphates and chlorides in the gases, removing said reacted mixture, leaching the tri-sodium phosphate therefrom with an alkali leaching liquid to form a liquor containing trisodium phosphate and crystallizing said tri-sodium phosphate from said liquor, whereby interference by said chlorides and sulphates with the crystallization of said tri-sodium phosphate is eliminated, and an uncontaminated tri-sodium phosphate is obtained.

2. The method of eliminating chlorides and sulphates from the continuous production of tri-sodium phosphate from comminuted ferrophosphorus and sodium carbonate containing chlorides and sulphates which comprises: admixing comminuted ferrophosphorus with sodium carbonate, heating said mixture in a heating zone to a reaction temperature below fusion by means of a blast of heated gases whereby the sulphates and chlorides contained therein are substantially completely removed in said gases and said ferrophosphorus is converted to tri-sodium phosphate, the velocity of said gases being greater than three feet per second, removing said gases from said reaction mixture, removing said reacted mixture, leaching the tri-sodium phosphate therefrom with an alkali leaching liquid to form a liquor containing tri-sodium phosphate and crystallizing said tri-sodium phosphate from said liquor, whereby interference by said chlorides and sulphates with the crystallization of said tri-sodium phosphate is eliminated, and an uncontaminated tri-sodium phosphate is obtained.

3. The method as set forth in claim 2, in which the velocity of said gases is not less than five feet per second and not more than eight feet per second.

4. The method of eliminating chlorides and sulphates from the continuous production of tri-sodium phosphate from comminuted ferrophosphorus and sodium carbonate containing chlorides and sulphates, which comprises passing hot gases over the reaction mixture, thereby removing chlorides and sulphates, centrifugalizing said gases to separate sulphates and chlorides from the remaining solids thereof, said gases being introduced into centrifugalizers at a speed of the order of 50-75 feet per second, returning the precipitated solids to the system, and removing the centrifugalized gases from the system.

5. The method of separating sulphates and chlorides from ferrophosphorus and tri-sodium phosphate in gases bearing the same, which comprises: centrifugalizing said gases to remove not more than 95% of the solids therefrom and separating said solids from the centrifugalized gases.

NILS CARLSON LINDBERG.